(12) United States Patent
Ishikawa et al.

(10) Patent No.: US 11,146,706 B2
(45) Date of Patent: Oct. 12, 2021

(54) IMAGE FORMING APPARATUS, NON-TRANSITORY COMPUTER READABLE MEDIUM STORING PROGRAM, AND IMAGE FORMING SYSTEM

(71) Applicant: FUJIFILM Business Innovation Corp., Tokyo (JP)

(72) Inventors: Tomohisa Ishikawa, Kanagawa (JP); Akihito Toyoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 245 days.

(21) Appl. No.: 16/182,626

(22) Filed: Nov. 7, 2018

(65) Prior Publication Data

US 2019/0149684 A1 May 16, 2019

(30) Foreign Application Priority Data

Nov. 15, 2017 (JP) .............................. JP2017-220205

(51) Int. Cl.
H04N 1/00 (2006.01)

(52) U.S. Cl.
CPC ..... *H04N 1/00901* (2013.01); *H04N 1/00474* (2013.01); *H04N 1/00925* (2013.01); *H04N 2201/0094* (2013.01)

(58) Field of Classification Search
CPC .......... H04N 1/00901; H04N 1/00474; H04N 1/00925; H04N 2201/0094
See application file for complete search history.

(56) References Cited

U.S. PATENT DOCUMENTS

| | | | |
|---|---|---|---|
| 9,407,113 B2 | 8/2016 | Tanaka | |
| 2012/0287458 A1* | 11/2012 | Misawa | ............. G03G 15/5004 358/1.14 |
| 2014/0010565 A1* | 1/2014 | Miyata | ................... G03G 15/80 399/88 |

FOREIGN PATENT DOCUMENTS

| | | |
|---|---|---|
| JP | 2001253152 | 9/2001 |
| JP | 2007048219 | 2/2007 |
| JP | 2010171678 | 8/2010 |
| JP | 2011059194 | 3/2011 |

(Continued)

OTHER PUBLICATIONS

"Office Action of Japan Counterpart Application", dated May 25, 2021, with English translation thereof, pp. 1-12.

*Primary Examiner* — Neil R McLean
(74) *Attorney, Agent, or Firm* — JCIPRNET

(57) ABSTRACT

An image forming apparatus includes a section that provides plural functions which include an image forming function and one or more server functions; a power storage device that is capable of supplying electricity to the image forming apparatus in a case where electricity is not supplied from an external power source; a reception section that receives and holds an input of setting information, which defines a stop target function or a work target function in a case where the electricity is supplied from the power storage device, from a user; and a controller that performs control to cause the stop target function, which is defined in the setting information, to be stopped among the plural functions, or performs control to cause the work target function, which is defined in the setting information, to be worked in the case where the electricity is supplied from the power storage device.

20 Claims, 14 Drawing Sheets

(56) References Cited

FOREIGN PATENT DOCUMENTS

| JP | 2013168869 | 8/2013 |
|----|------------|--------|
| JP | 2014176193 | 9/2014 |

* cited by examiner

FIG. 3

| FUNCTION | WORK FLAG DURING POWER FAILURE | DEPENDENCY DESTINATION FUNCTION |
|---|---|---|
| SCAN DEVICE | OFF | |
| PRINT DEVICE | OFF | |
| FAX DEVICE | ON | |
| WIRED NETWORK | ON | |
| WIRELESS NETWORK | OFF | |
| DISPLAY DEVICE | ON | |
| POST-PROCESSING DEVICE | OFF | PRINT DEVICE |
| MAIL SERVER | ON | NETWORK |
| USER AUTHENTICATION SERVER | OFF | |
| FILE SERVER | ON | |
| WEB SERVER | OFF | NETWORK |
| SCAN SERVICE | OFF | SCAN DEVICE |
| PRINT SERVICE | OFF | PRINT DEVICE |
| COPY SERVICE | OFF | SCAN DEVICE PRINT DEVICE |
| FAX TRANSMISSION | OFF | FAX DEVICE |
| FAX RECEPTION | ON (POWER STORAGE MODE) | FAX DEVICE |
| TELEPHONE SERVICE | ON | FAX DEVICE |

FIG. 12

FUNCTION TO BE WORKED IN CASE WHERE UPS IS DRIVEN (DURING POWER FAILURE) — 200

| FUNCTION | POWER CONSUMPTION |
|---|---|
| PRINT | LARGE |
| COPY | LARGE |
| SCAN | MIDDLE |
| POST-PROCESSING | LARGE |
| FAX TRANSMISSION | MIDDLE |
| FAX RECEPTION (POWER STORAGE MODE) | SMALL |
| MAIL SERVER | SMALL |
| USER AUTHENTICATION SERVER | SMALL |
| FILE SERVER | SMALL |
| WEB SERVER | SMALL |

— 202a (PRINT row)
— 202b (FAX RECEPTION row)

DRIVE TIME USING POWER STORAGE DEVICE IN ABOVE SELECTION STATE IS

[ 120 ] MINUTES — 210

[ DETERMINATION ]

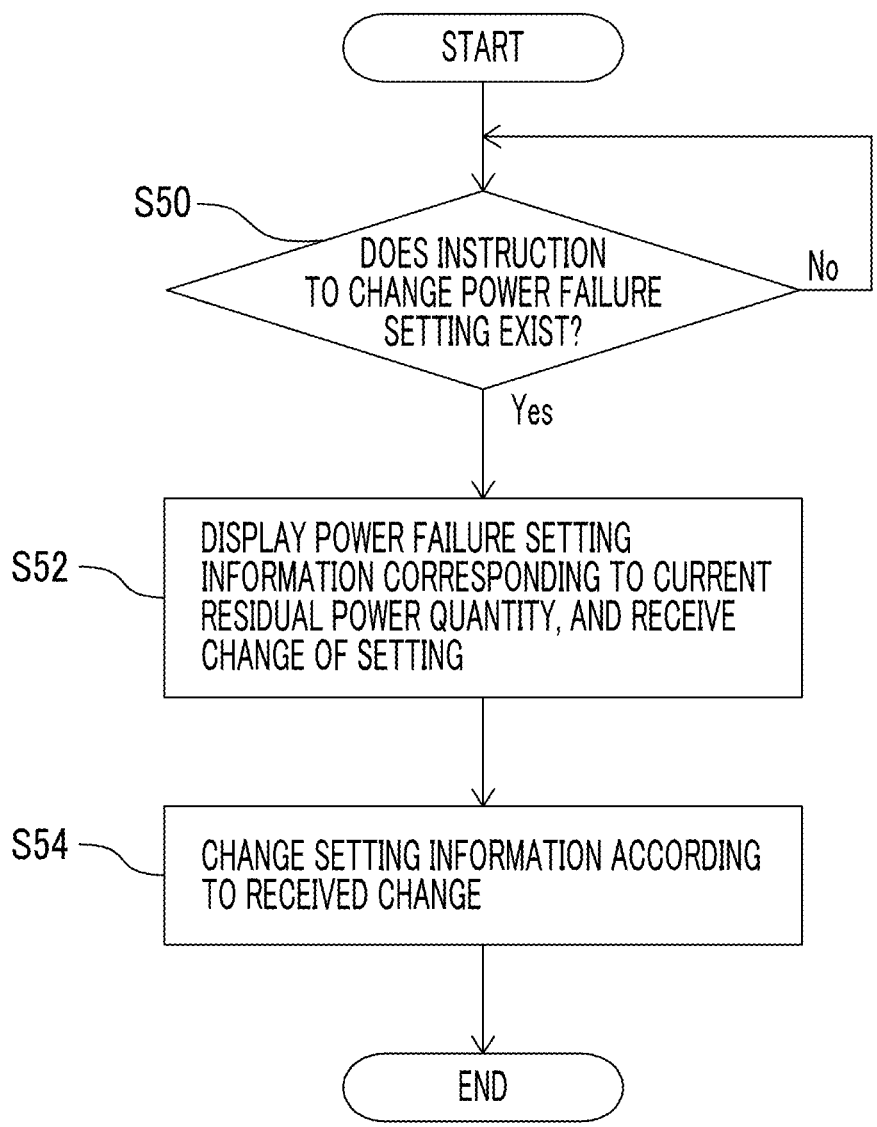

IMAGE FORMING APPARATUS, NON-TRANSITORY COMPUTER READABLE MEDIUM STORING PROGRAM, AND IMAGE FORMING SYSTEM

CROSS-REFERENCE TO RELATED APPLICATIONS

This application is based on and claims priority under 35 USC 119 from Japanese Patent Application No. 2017-220205 filed Nov. 15, 2017.

BACKGROUND (i) Technical Field

The present invention relates to an image forming apparatus, a non-transitory computer readable medium storing a program, and an image forming system.

(ii) Related Art

A multifunction printer is widespread which combines functions of a printer, a scanner, a copying machine, a facsimile device, and the like. In recent years, a multifunction printer also appears which has server functions of a mail server, a file server, and the like and which provides the server functions to clients through a network. In addition, an example is known that an Uninterruptible Power Supply (UPS) is provided in the multifunction printer in order to prevent disturbances due to sudden down of the server functions in a case of power failure.

SUMMARY

According to an aspect of the invention, there is provided an image forming apparatus, including: a section that provides plural functions which include an image forming function and one or more server functions; a power storage device that is capable of supplying electricity to the image forming apparatus in a case where electricity is not supplied from an external power source; a reception section that receives and holds an input of setting information, which defines a stop target function to be stopped or a work target function to be worked in a case where electricity is supplied from the power storage device among the plural functions, from a user; and a controller that performs control to cause the stop target function, which is defined in the setting information, to be stopped among the plural functions, or performs control to cause the work target function, which is defined in the setting information, to be worked among the plural functions in the case where the electricity is supplied from the power storage device.

BRIEF DESCRIPTION OF THE DRAWINGS

Exemplary embodiment(s) of the present invention will be described in detail based on the following figures, wherein:

FIG. 3 is a diagram illustrating an example of power failure setting information;

FIG. 12 is a diagram illustrating the setting screen of the power failure setting information, which displays a degree of electricity consumption of each function and a guide of time that corresponds to setting content and is driven by the power storage device;

FIG. 15 is a flowchart illustrating a procedure of changing setting of the power failure setting information during the power failure.

DETAILED DESCRIPTION

Figure 1:
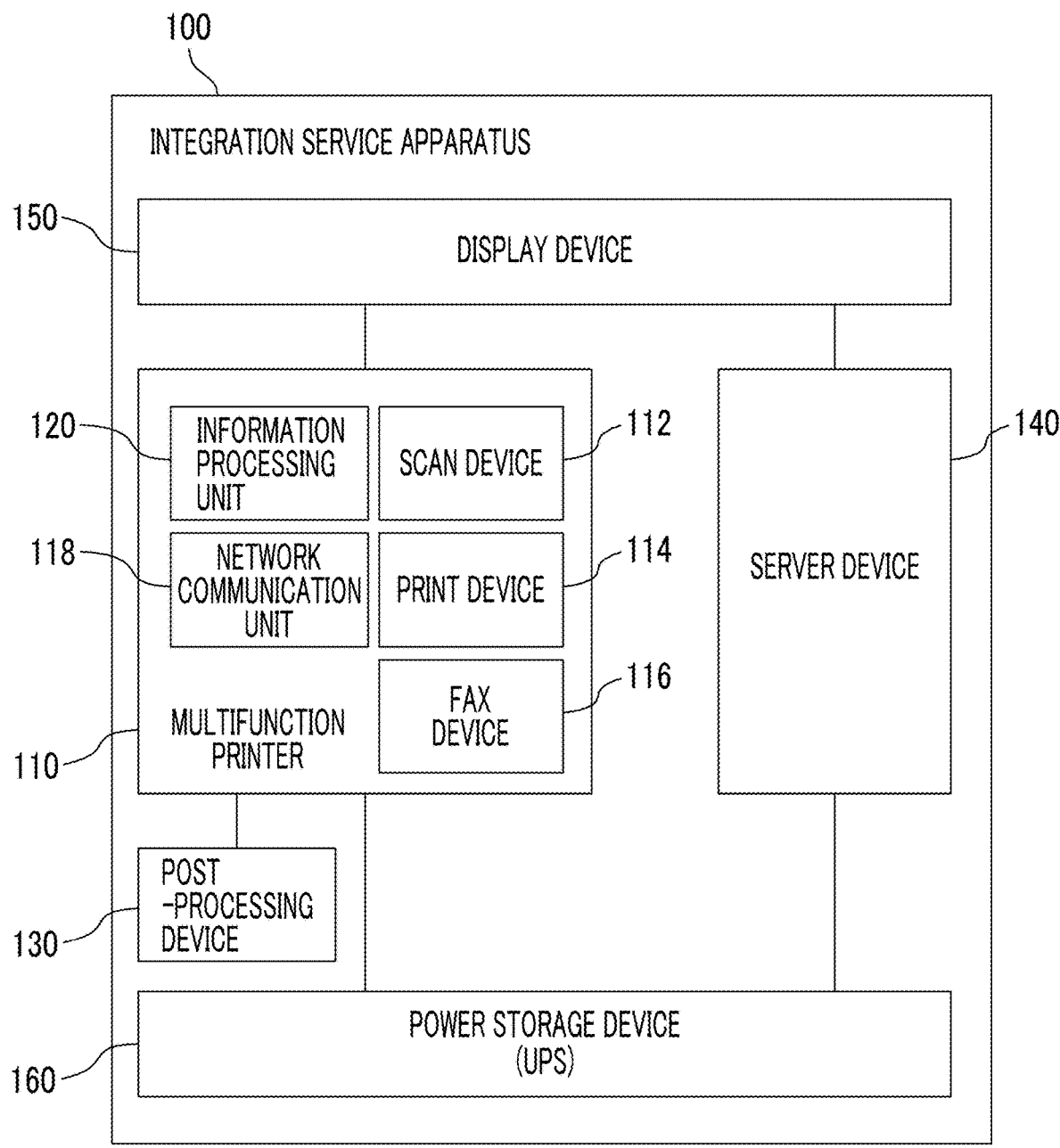
FIG. 1 is a diagram illustrating a schematic configuration of an integration service apparatus which has a multifunction printer function and a server function, and includes a power storage device.

An exemplary embodiment of an integration service apparatus 100 will be described with reference to FIG. 1.

The integration service apparatus 100 includes a multifunction printer 110, a post-processing device 130, a server device 140, a display device 150, and a power storage device 160. In an example, the integration service apparatus 100 may be configured as one apparatus in which the multifunction printer 110, the post-processing device 130, the server device 140, the display device 150, and the power storage device 160 are embedded in a single housing. In this case, the integration service apparatus 100 embeds a group of elements which configure the respective devices including the multifunction printer 110, the post-processing device 130, the server device 140, the display device 150, and the power storage device 160. In addition, in another example, the respective devices including the multifunction printer 110, the post-processing device 130, the server device 140, the display device 150, and the power storage device 160 are respectively embedded in separate housings, and the integration service apparatus 100 may be configured as a system which connects the devices in the separate housings. In addition, there may be an intermediate system form of the two examples, that is, a form in which the integration service apparatus 100 is configured as the system that connects the plural housings (devices) and in which two or more devices among the respective devices including the multifunction printer 110, the post-processing device 130, the server device 140, the display device 150, and the power storage device 160 are embedded in one or more among the housings.

The multifunction printer 110 is a device which has scanning, printing, copying, and facsimile (FAX) transmitting/receiving functions. The multifunction printer 110 includes a scan device 112, a print device 114, a FAX device 116, a network communication unit 118, and an information processing unit 120 as functional elements.

The scan device 112 optically reads a document, such as paper, and generates image data of the document. A scan process is realized in a case where the information processing unit 120 preserves the image data generated by being read by the scan device 112 in a fixed storage device in the multifunction printer 110 or a portable recording medium (for example, a USB memory) or transfers the image data to a destination (for example, a mail address, a specific folder in a file server, or the like) designated by the user.

The print device 114 prints the image data, which is acquired through the scan, and image data, which is generated from printed data that is written in a page descriptive language, on paper. In a case where an image which is read by the scan device 112 is printed using the print device 114, a copying function is realized.

The FAX device 116 transmits/receives FAX image data through a telephone line. Transmission of the FAX is realized in such a way that an image of the document, which is read by the scan device 112, is transmitted to a destination number by the FAX device 116. In addition, reception of the FAX is realized in such a way that the FAX device 116 receives the FAX image data transmitted from a transmission source, prints the image data using the print device 114, or preserves the image data as a file in a predetermined folder under management of the information processing unit 120.

The network communication unit 118 performs data communication through a network such as a Local Area Network (LAN). The network communication unit 118 may include both a communication device, which performs communication through a wired network, and a communication device, which performs communication in conformity to a wireless network protocol, such as Wi-Fi (registered trademark), or may include only one of the communication devices.

The information processing unit 120 performs information processing which includes control of the multifunction printer 110. The information processing unit 120 includes hardware, such as a primary storage including a Central Processing Unit (CPU), a random access memory, and the like and a secondary storage including a hard disk or a non-volatile memory, and a group of programs which realize the information processing by being executed by the CPU. An information processing function, which is performed by the information processing unit 120, will be further described with reference to FIG. 2.

The post-processing device 130 is a device which performs post-processing, such as hole punching, stapling, or book binding, on a printout from the print device 114. The post-processing device 130 receives electricity supply from a power circuit of the multifunction printer 110.

The server device 140 is a device which provides one or more of various server functions, such as a mail server, a user authentication server, and a web server. Each of the servers provides a service to clients on the Local Area Network (LAN) or on the Internet. In an example, the server device 140 includes a computer (which is configured as a plate on which, for example, the CPU, a memory, and the like are mounted) as hardware used to execute programs of the respective servers. The server device 140 may include plural computers as the hardware. In a case where the individual computers, which are included in the server device 140, respectively execute one or more server programs, one or more server functions provided by the integration service apparatus 100 are realized.

In an example, some of one or more server functions, which are provided by the integration service apparatus 100, may be performed by the information processing unit 120 of the multifunction printer 110. In addition, as another example, the server device 140 may be a virtual server which is performed on the information processing unit 120 of the multifunction printer 110. In this case, the server device 140 as the hardware does not exist, and all the server functions are provided by the information processing unit 120 on the multifunction printer 110. That is, for convenience of explanation, FIG. 1 separately shows the information processing unit 120 of the multifunction printer 110 and the server device 140. However, it is not necessary that the information processing unit 120 and the server device 140 are separated in a hardware manner.

The display device 150 displays an operation screen which is one element of a User Interface (UI) of the integration service apparatus 100. The operation screen is generated by, for example, a UI control unit 1202 illustrated in FIG. 2. The display device 150 may be, for example, a touch panel display. Meanwhile, the integration service apparatus 100 may include UI devices, such as a mechanical-type ten keys and buttons, a display lamp, a speaker, and a camera, in addition to the display device 150.

The power storage device 160 is connected to an external power source, such as a commercial power source, and, normally, supplies electricity from the external power source to the respective elements, such as the multifunction printer 110 and the server device 140, in the integration service apparatus 100. In addition, the power storage device 160 has a function of storing the electricity from the external power source and supplying the stored electricity to the respective elements in the integration service apparatus 100 in a case where the electricity is not supplied from the external power source. The case where the electricity is not supplied from the external power source includes a case where the power failure occurs in the commercial power source, which is the external power source, due to a stroke of lighting, an accident, or the like, a case where the external power source (for example, a private power station system) does not work due to failure or the like, a case where a connector (attachment flag), which is used for the integration service apparatus 100 (specifically, the power storage device 160) to receive the supply of the electricity from the external power source, is separated from an external power source-side connector (flag reception, for example, a socket), and the like. Hereinafter, a state, in which the electricity is not supplied to the integration service apparatus 100 from the external power source, is referred to as the "power failure", and a period, during which the above state is continued, is referred to as "during the power failure". During the power failure, the electricity stored by the power storage device 160 is supplied to the respective parts of the integration service apparatus 100. The power storage device 160 is configured as, for example, an uninterruptible power supply.

Subsequently, an example of a functional configuration of the information processing unit 120 will be described with reference to FIG. 2. In FIG. 1, for convenience, description is performed such that the information processing unit 120 belongs to the multifunction printer 110. However, the information processing unit 120 performs control and a process for the whole integration service apparatus 100 which includes the server device 140, the power storage device 160, and the like, in addition to performs control on the hardware (the scan device 112, the print device 114, or the like) of the multifunction printer 110. The control for the whole integration service apparatus 100 includes a UI process, control during the power failure, and the like. FIG. 2 illustrates functions relevant to the UI process, the control during the power failure, and the like among the various functions included in the information processing unit 120.

In FIG. 2, the UI control unit 1202 performs control for a UI of the integration service apparatus 100. The UI control unit 1202 generates, for example, various operation screens which are displayed on the display device 150, or detects an operation performed by the user on Graphical User Interface (GUI) components on the operation screen or various mechanical buttons.

A setting management unit 1204 manages various pieces of setting information with respect to the integration service apparatus 100. The setting information managed by the setting management unit 1204 includes setting information (power failure setting information 1206) relevant to the control during the power failure in addition to, for example, settings relevant to various functions such as the copying function and a scan function. In addition, in a case where the power failure occurs while the user is operating a local UI of the integration service apparatus 100, it is possible to set power disconnection time, which is delay time until the supply of the electricity with respect to a previously set function is disconnected, in the setting management unit 1204 (details will be described later).

The power failure detection unit 1208 detects the power failure (in other words, a state in which the stored electricity of the power storage device 160 is fed to the respective parts of the integration service apparatus 100) of the external power source, which is fed to the integration service apparatus 100. For example, the power storage device 160 has a function of detecting the power failure of the external power source, the power failure detection unit 1208 of the information processing unit 120 acquires information (in other words, information which indicates any one of feeding from the external power source and feeding from the stored electricity), which indicates whether or not the power failure occurs, from the power storage device 160. In addition, the power failure detection unit 1208 may acquire pieces of information, such as a residual power quantity and a history of an electricity consumption quantity, from the power storage device 160.

In a case where the power failure detection unit 1208 detects the power failure, a power failure control unit 1210 stops a function, which is previously set as a stop target during the power failure, or performs control on switching of the operation screen according to the stopping. A detailed example of the power failure control unit 1210 will be described later.

The operational state determination unit 1212 determines whether or not the user is operating the local UI (the display device 150, the ten keys, or the like) of the integration service apparatus 100. A well-known method may be used to determine whether or not the user is operating. For example, the operational state determination unit 1212 determines as being operated from a point of time at which the user performs the operation (for example, touching the screen, pressing any of buttons, inputting an instruction using voice, and the like) with respect to the local UI until at least prescribed (that is, predetermined) time elapses. Furthermore, in a case where a non-operation period continues during the prescribed time or more, it is determined as being not operated ("not being operated"), and, thereafter, it is determined as being not operated until the user performs any of operation on the local UI. In another example, a sensor, such as a person sensing sensor, is provided in order to detect a person who is in the vicinity of a front surface (a side on which the display device 150, the ten keys, and the like are provided) of the integration service apparatus 100, and it may be determined as "being operated" for a period during which the sensor is detecting a person and it may be determined as "being not operated" except the above period.

FIG. 3 illustrates an example of the power failure setting information 1206 which is maintained in the setting management unit 1204. In the illustrated power failure setting information, a work flag during the power failure is provided to each of the functions included in the integration service apparatus 100.

Here, the function includes hardware and software. The scan device 112, the print device 114, the FAX device 116, the wired and wireless networks (the network communication unit 118), the display device 150, and the post-processing device 130 are functions as the hardware, respectively. The various server functions as the mail server, the user authentication server, and the like are functions of software provided by the server device 140. In addition, a scan service, a print service, a copy service, FAX transmission, FAX reception, and a telephone service are software functions which take charge of the UI and information processing for the scan, the print, the FAX, the telephone, and the like.

The work flag during the power failure is a setting item which indicates whether or not to cause a function to work during the power failure (that is, a period during which the power storage device 160 feeds the stored electricity into the integration service apparatus 100). A function, in which the work flag during the power failure is "ON", is a work target function which is caused to work during the power failure. In contrast, a function, in which the work flag during the power failure is "OFF", is not caused to work during the power failure. That is, the function, in which the work flag during the power failure is "OFF", is a stop target function which is a target of a stop during the power failure. A value of the work flag during the power failure may be fixed (that is, it is not possible to change the value on a side of the user) or may be set by the user (typically, a manager of the integration service apparatus 100).

In addition, in the power failure setting information, a dependency destination function may be registered for each function. A dependency destination function for a certain function (referred to as a first function) is a function which is a premise in order to exhibit the first function. For example, in a case where the print device does not work, it is not possible to exhibit a function of the post-processing device (in other words, it is useless to cause the post-processing device to work in such a case), and thus the print device has the dependency destination function for the post-processing device. In addition, it is meaningless that only the mail server works in a state in which a wired or wireless network does not work, and thus the functions of the networks are the dependence functions for the mail server. Although the file server and the user authentication server provide services to the clients on the networks, it is possible for the integration service apparatus 100 to use the services alone (for example, printing is performed by designating a file in the filer server from the UI of the integration service apparatus 100). Therefore, in definition of the dependency destination function in the example, the networks do not correspond to the dependency destination functions of the servers. In the exemplary embodiment, in a case where the work flag during the power failure of a certain function is set to OFF, a work flag during the power failure of another function, which has the certain function as the dependency destination function, is automatically changed to OFF. The power failure setting information illustrated in FIG. 3 indicates each of the plural functions included in the integration service apparatus 100 which are set to any of the work target function during the power failure and the stop target function. Instead, a list of only the stop target functions during the power failure among the plural functions may be used as the power failure setting information. In this case, the power failure control unit 1210, which will be described later, stops the stop target functions, which are indicated by the power failure setting information, and maintains the other functions during the power failure. In addition, a list of only the work target functions during the power failure among the plural functions may be used as the power failure setting information. In this case, the power failure control unit 1210 maintains a work state of each of the work target functions, which are indicated by the power failure setting information, and stops the functions other than the work target function during the power failure.

Meanwhile, content of the power failure setting information 1206 illustrated in FIG. 3 is only an example. As another example, the power failure setting information 1206 may express further rough setting content, in which the multi-function printer 110 (performs functions of print, scan, copy, or the like) is set to the stop target during the power failure, the server device 140 (the mail server, the file server, or the like) is not set to the stop target during the power failure, and the like.

Basic reference of determination of a function to be worked and a function to be stopped during the power failure is a magnitude of electricity consumption. A case of the power failure depends on feeding from the power storage device 160 which has a limitation on the residual power quantity. Therefore, in order to enable a necessary function to be used as long as possible, it is necessary to stop a function in which the electricity consumption is large. For example, it is necessary for the print device 114 to operate a mechanical device for print, and thus electricity consumption is large. Specifically, in a case where an electronic picture method is used, enormous electricity is consumed to generate heat for fixing a toner to paper. The scan device 112 also consumes relatively large electricity for the mechanical device, such as document feeding, lighting with respect to the document, and the like. The electricity consumption of the server device 140 is small, compared to the above devices. In addition, in a case of the power failure due to disaster, there is a possibility that the server functions other than the mail server function perform a crucial role as one alternative of an information communication infrastructure. Therefore, a basic policy is to stop feeding to the multifunction printer 110 which includes the print device 114 and the scan device 112 in order to extend work time of the integration service apparatus 100 during the power failure. However, since a function, which is desired to be maintained during the power failure, depends on circumstances on a side of the user, the user is enabled to set the function to be worked and the function to be stopped during the power failure in the above-described example.

Figure 4:
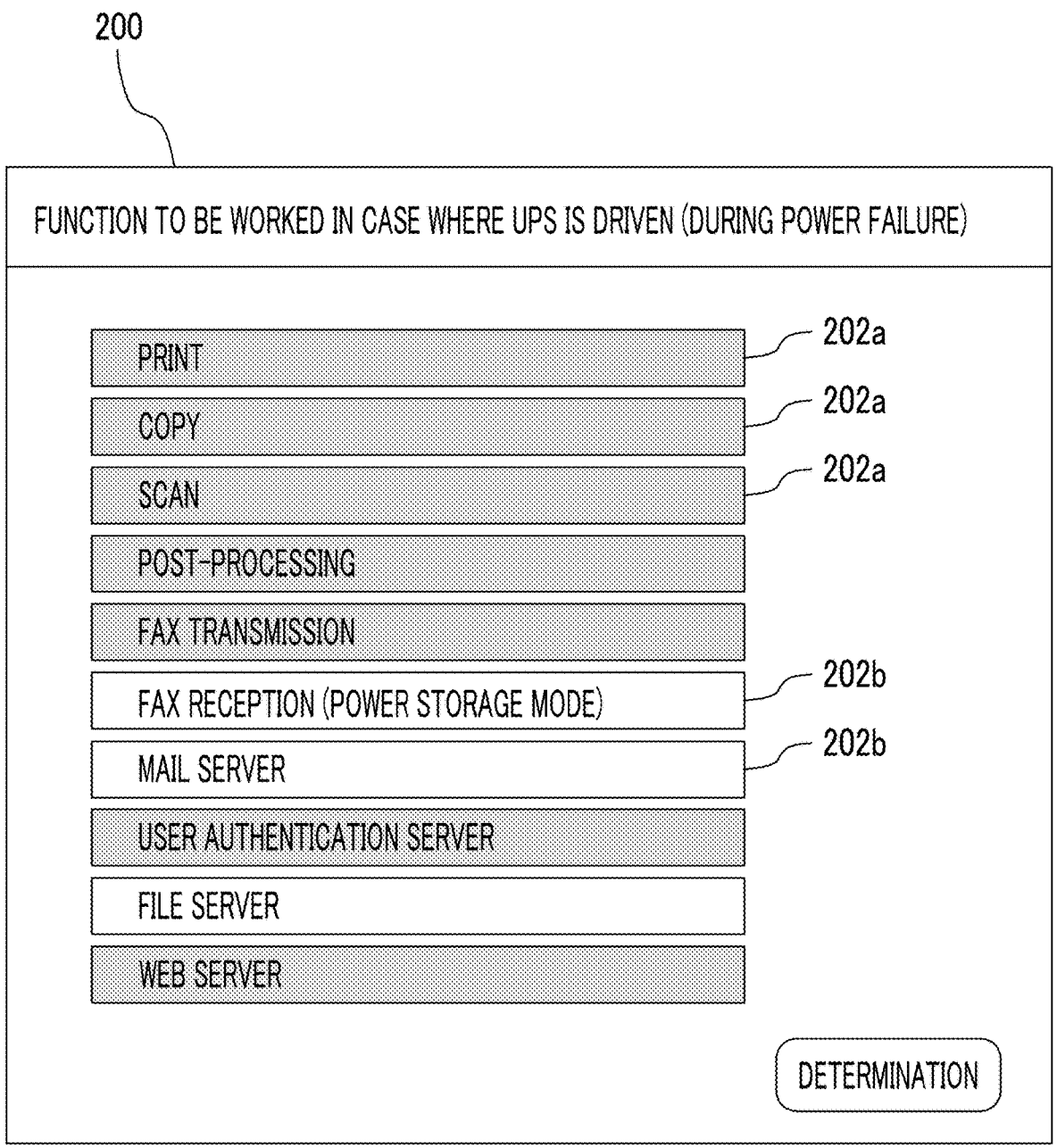
FIG. 4 is a diagram illustrating an example of a setting screen of the power failure setting information.

FIG. 4 illustrates a setting screen 200 of the power failure setting information 1206, which is displayed on the display device 150 by the UI control unit 1202. In the example, GUI buttons 202a and 202b, which display names of functions, are displayed for the respective functions on the setting screen 200. In the example of the drawing, a value of the work flag during the power failure of a relevant function is expressed by a color of each of the buttons 202a and 202b. The button 202a, which has a gray color, indicates that the work flag during the power failure is "OFF", and the button 202b, which has a white color, indicates that the work flag during the power failure is "ON". For example, whenever the user presses (taps) the button 202a or 202b, the value (ON or OFF) of the work flag during the power failure of the function corresponding to the button 202a or 202b is switched, and the color of the button 202a or 202b is switched between white and gray according to the switching of the value of the work flag. The setting screen 200, which is called by the user, provides a display state in which the value of the work flag during the power failure for each function in the current power failure setting information 1206 is reflected, and change is added with respect to the display state. The user recognizes a group of the functions, which are displayed on the setting screen 200, to be worked during the power failure. In a case where the setting is ok, the user presses a "determination" button in the screen. Therefore, the setting management unit 1204 changes the content of the power failure setting information into content which indicates a state which is set on the setting screen 200.

In the power failure setting information 1206 of a default state (in a case of factory shipment or the like), for example, the work flag during the power failure may be set to OFF for a function (print, copy, scan, FAX transmission/reception, or the like) of using the mechanical device of the multifunction printer 110, and the work flag during the power failure may be set to ON for the server function.

Meanwhile, a setting method for switching the work flag during the power failure by tapping the button 202a or 202b on the setting screen 200 is only an example. Various well-known methods may be used for the setting of the power failure setting information 1206. For example, in a case where the button 202a or 202b is tapped, a switching screen of the work flag during the power failure of the relevant function is called, and ON and OFF of the flag on the switching screen may be switched. In addition, in a case where the button 202a or 202b is tapped, a detailed setting screen during the power failure for the relevant function may be called, and it is possible to set the details for an operation of the function during the power failure on the detailed setting screen. For example, in a case where a button of a "print" function is pressed, the detailed setting screen, which is used to switch the work flag during the power failure of the print device 114 as the hardware and the work flag during the power failure of the print service as the software, may be displayed. In a case where the work flag during the power failure of the print device 114 is set to OFF on the screen, the work flag during the power failure of the print service, which depends on the print device, is also changed to OFF. In contrast, even in a case where the print service is set to OFF, the print device 114 is not automatically changed to OFF. In addition, in a case where a button of the FAX reception is pressed on the setting screen 200, a detailed setting screen for the FAX reception may be displayed. In the detailed setting screen, for example, an operation in the FAX reception during the power failure may be enabled to be selected from some alternatives including stopping a whole FAX reception function, accumulating a received FAX as data without printing, and printing the received FAX.

Subsequently, an example of control performed by the power failure control unit 1210 in a case where the power failure detection unit 1208 detects the power failure will be described with reference to flowcharts of FIGS. 5 and 6.

Figure 7:
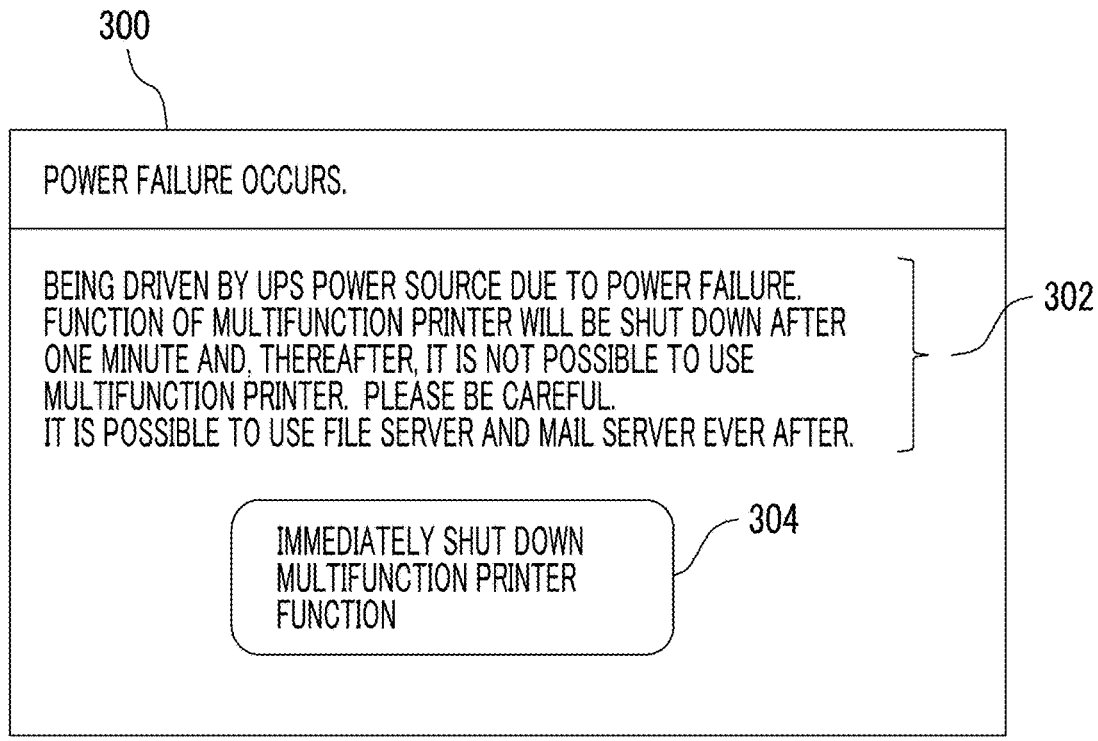
FIG. 7 is a diagram illustrating an example of a screen which is displayed during a power failure and notices disconnection of power to a partial function.

In the example, in a case where the power failure is detected, the power failure control unit 1210 inquires of the operational state determination unit 1212 about whether or not, currently, the user is locally operating the integration service apparatus 100 (S10). In a case where a response having a gist that the user is operating is received from the operational state determination unit 1212 with respect to the inquiry, the power failure control unit 1210 reads the power disconnection time which is set in the setting management unit 1204 (S12). In addition, the power failure control unit 1210 instructs the UI control unit 1202 to display a power disconnection notice screen (S14). The power disconnection notice screen is a screen used to give notice that the function, which is set to the stop target during the power failure, is stopped (that is, supply of electricity with respect to the function is stopped). FIG. 7 illustrates an example of a power disconnection notice screen 300. A message 302, which explains a situation, is displayed on the power disconnection notice screen 300. The illustrated message 302 indicates a fact that, currently, the power failure occurs, a fact that the integration service apparatus 100 works attributable to feeding from the power storage device (Uninterruptable Power Supply (UPS)), a fact that a specific function (a function of the multifunction printer 110 in the example of the drawing) is shut down after the prescribed power disconnection time (one minute in the example of the drawing) and thus it is not possible to use the specific function, and a fact that it is possible to use another function (the mail server or the like in the example of the drawing) ever after. In a case where the power failure occurs while the user is operating the UI and the power disconnection notice screen 300 is displayed, the user views the display and understands that it is not possible to use a stop target function after the prescribed time elapses from now on. Furthermore, in a case where the operation, which is operated until now, is performed to use the stop target function, the user stops using the function if it is possible to complete a process which uses the function in time. In addition, in a case where the operation, which is performed by the user until now, is for the function to be worked during the power failure, the user removes the power disconnection notice screen 300 by pressing a removal button, which is not illustrated in the drawing, returns to a screen for the function, and continues the operation on the screen.

In addition, the power disconnection notice screen 300 includes an instruction button 304 used to shut down the stop target function during the power failure without waiting for elapse of the power disconnection time. In a case where the user presses the instruction button 304, the stop target function is immediately shut down, and the supply of the electricity to the stop target function is stopped.

Meanwhile, a predetermined person, such as a manager, sets a value of the power disconnection time in the setting management unit 1204. In addition, time, which remains until the elapse of the power disconnection time, may be counted down and displayed on the screen by taking a possibility that the power disconnection notice screen 300 is displayed in somewhat long time into consideration. The power disconnection notice screen 300 is removed in a case where the instruction button 304 is pressed or the prescribed time (for example, the power disconnection time) elapses, and, thereafter, a screen, which is displayed immediately before the power disconnection notice screen 300 is displayed, is displayed.

Figure 5:
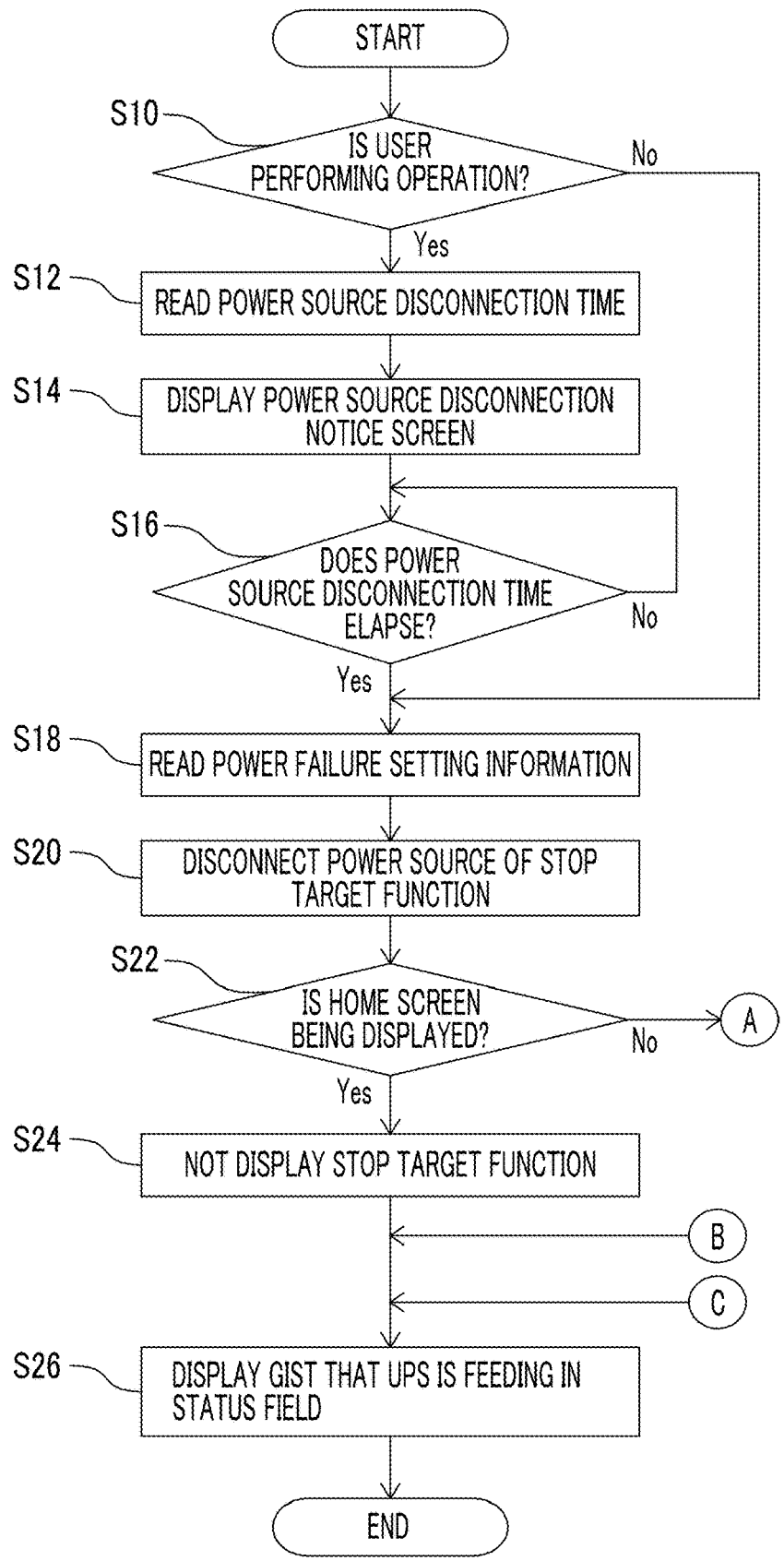
FIG. 5 is a flowchart illustrating a part of a control procedure of a power failure control unit.

Returning to description with reference to FIG. 5, after the process in S14 is performed, the power failure control unit 1210 waits for the elapse of the power disconnection time (S16), and proceeds to S18 in a case where the power disconnection time elapses. In addition, in a case where the user is currently operating the local UI of the integration service apparatus 100 in S10, the power failure control unit 1210 proceeds to S18.

In S18, the power failure control unit 1210 reads the power failure setting information 1206 from the setting management unit 1204. Furthermore, the power failure control unit 1210 stops (shuts down) the stop target function during the power failure (that is, a function in which the work flag during the power failure is OFF) shown in the power failure setting information 1206, and stops supplying the electricity to the stop target function (S20).

Subsequently, the power failure control unit 1210 determines whether or not a screen, which is being displayed on the current display device 150, is a home screen of the integration service apparatus 100 (S22). Here, the home screen is a screen in which a menu of a list of functions of the integration service apparatus 100 is displayed. The user selects a function, which is desired for the user to use on the home screen, and opens a detailed screen used to input a detailed instruction for the function. In a case where a result of determination in S22 is Yes, the power failure control unit 1210 instructs the UI control unit 1202 to display a home screen 310 which does not display a GUI component (for example, an icon) used to select the stop target function (S24). In addition, the power failure control unit 1210 instructs the UI control unit 1202 to display a gist that the function is driven attributable to feeding from the power storage device (UPS) in a status field of the home screen 310 (S26).

Figure 8:
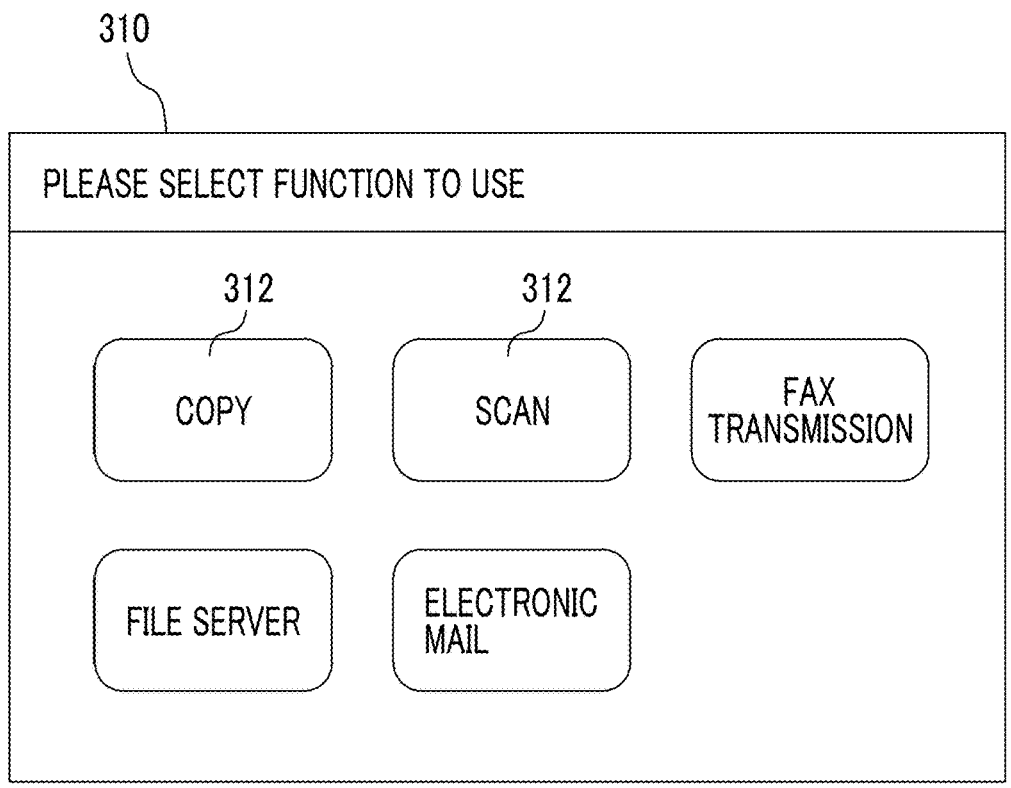
FIG. 8 is a diagram illustrating an example of a normal home screen (an initial screen of a multifunction printer)

For example, it is assumed that a normal (that is, in a state in which the power failure does not occur) home screen 310 is illustrated in FIG. 8. In the home screen 310, icons 312, which are used to call detailed screens of the respective functions, such as the copy, the scan, the FAX transmission, the file server, and the electronic mail, are displayed. In contrast, in a home screen 310a (refer to FIG. 9), which is displayed as results of the processes in S24 and S26, during the power failure, the icons 312 of the file server and the electronic mail, which are maintained during the power failure, are displayed. However, the icons of the copy, the scan, and the FAX transmission, which are the stop target functions during the power failure, are not displayed. In addition, in the home screen 310a, a status field 314, which displays a message that available functions are limited due to feeding of the UPS, is displayed. The user grasps a reason that the icons of the copy, the scan, and the like do not exist in the home screen 310a through the display of the status field 314.

Figure 9:
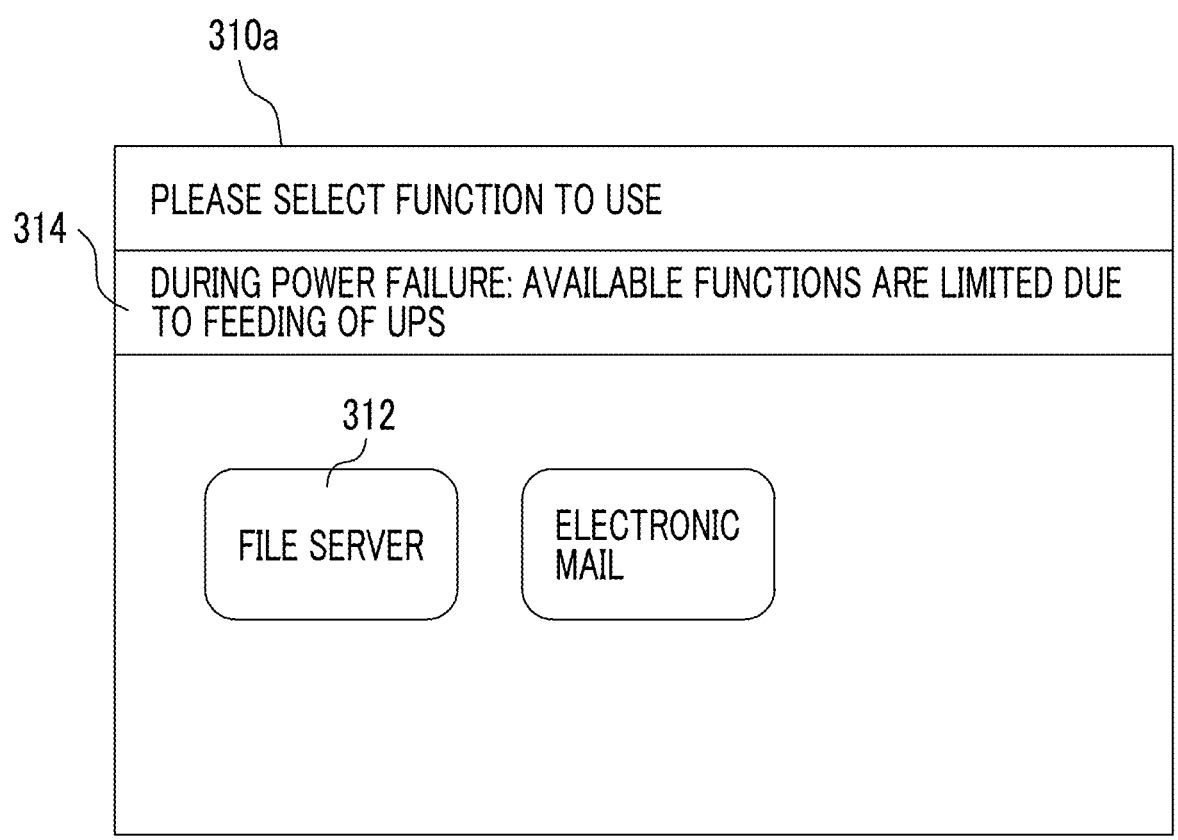
FIG. 9 is a diagram illustrating an example of a home screen during the power failure.

Meanwhile, although the icons of the stop target functions are not displayed in S24 and in the example of FIG. 9, S24 and FIG. 9 are only the examples. Instead, the icons of the stop target functions may be gray-out displayed (displayed in an inconspicuous state rather than usual, thereby indicating an unselectable state), such that selection from the user is not received. In addition, as further another example, the same home screen 310 is displayed during normal time and during the power failure. In a case where the icons 312 of the stop target functions are pressed on the home screen 310 during the power failure, a fact that the functions are stopped may be displayed (for example, the gist is displayed in the status field on the home screen 310).

Figure 6:
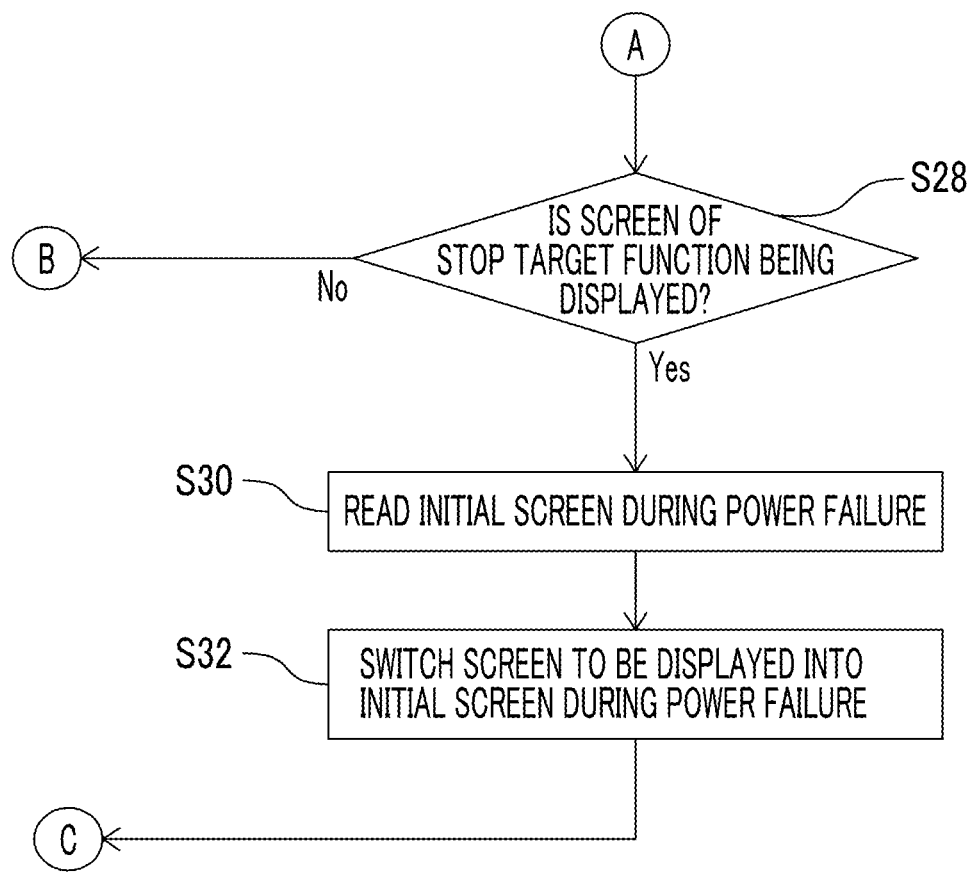
FIG. 6 is a flowchart illustrating a remaining part of the control procedure of the power failure control unit.

In a case where it is determined that the screen, which is currently displayed, is not the home screen 310 in S22 (in other words, in a case where any of the detailed screens, which are called by pressing the icons on the home screen 310, is displayed), the power failure control unit 1210 proceeds to a process in S28 illustrated in FIG. 6. In S28, the power failure control unit 1210 determines whether or not the screen, which is currently displayed, is the detailed screen of the stop target function during the power failure (S28). Ina case where a result of the determination is No, that is, the screen, which is currently displayed, is a detailed screen of the function which is worked during the power failure, the power failure control unit 1210 proceeds to S26, and displays the status field (which is the same as the status field 314 of FIG. 9) which indicates the gist that the UPS is feeding on the detailed screen. In a case where the result of the determination is S28 is Yes, the power failure control unit 1210 reads a previously set initial screen during the power failure (S30), the power failure control unit 1210 instructs the UI control unit 1202 to display the initial screen (S32). The initial screen during the power failure is previously set in the setting management unit 1204 by the user. For example, the user selects and sets the initial screen during the power failure among candidates, such as the home screen 310a (refer to FIG. 9) and the power disconnection notice screen 300 (refer to FIG. 7), which are previously prepared. Thereafter, the power failure control unit 1210 proceeds to S26, and displays the status field, which indicates the gist that UPS is feeding, in the detailed screen.

The procedure in FIG. 5 is performed in a case where the power failure occurs while the integration service apparatus 100 is working. In contrast, the power failure may occur in a case where the integration service apparatus 100 is in a state of power source OFF or a sleeping state and, thereafter, the power failure may be continued even at a point of time during which the integration service apparatus 100 is driven and the state transitions from the above state to a work state. In this case, the power failure control unit 1210 preforms, for example, the following processes. That is, the power failure control unit 1210 inquires of the power failure detection unit 1208 about occurrence or non-occurrence of the power failure in a case where the integration service apparatus 100 is driven (in a case where the power source is ON or returns from the sleeping state), and the power failure control unit 1210 instructs the UI control unit 1202 to display the normal home screen 310 (refer to FIG. 8) in the display device 150 in a case where a response, such as non-power failure, is acquired. In contrast, in a case where a response of during the power failure is acquired from the power failure detection unit 1208, the power failure control unit 1210 does not drive the stop target function indicated by the power failure setting information 1206 and stops feeding to the stop target function. Furthermore, the power failure control unit 1210 instructs the UI control unit 1202 to display the previously set initial screen during the power failure (the home screen 310a or the like of FIG. 9). Therefore, in a case where the integration service apparatus 100 is driven during the power failure, the user is notified that the power fails and the UI, which enables the available functions to be selected during the power failure, is provided.

In addition, the UI control unit 1202 may display a GUI component (for example, a button) which calls list display of the available functions during the power failure on the operation screen which is displayed on the display device 150 during the power. In a case where an instruction to display the list display is input with respect to the GUI component, the UI control unit 1202 displays a list screen, which displays a list of functions, which is shown in the power failure setting information 1206 and in which the work flag during the power failure is ON. With the list screen, the user understands the available functions at that time (during the power failure). In addition, display of each function on the list screen may be linked to the detailed screen of the function such that it is possible to call the detailed screen of the function from the list screen. In addition, instead of the list of the available functions during the power failure, a list of unavailable functions (that is, functions in which the work flag during the power failure is OFF) during the power failure may be displayed. In addition, both the list of the available functions during the power failure and the list of the unavailable functions may be displayed.

In addition, in the above description, the processes in FIGS. 5 and 6 immediately start in a case where the power failure occurs (that is, in a case where feeding from the stored electricity of the power storage device 160 starts). However, the power failure includes a momentary power failure, such as lighting, which takes a short time. In a case where the above-described stop target function is stopped or the operation screen is changed during the power failure, which takes a short time, a process or the like of returning the function and the operation screen to original states is necessary in a case of returning from the power failure, thereby being complicated on the contrary. Here, even in a case where the power failure is detected, the power failure control unit 1210 may start the processes in FIGS. 5 and 6 only after the power failure state is continued during predetermined time without immediately starting the processes in FIGS. 5 and 6.

As described above, in the exemplary embodiment, in a case of working the integration service apparatus 100 through feeding from the power storage device 160 due to the power failure, the feeding to some previously set functions is stopped, and thus work time of remaining functions extend. In addition, the functions, which are working, and the functions (stop target functions), which are stopping, during the power failure are separately displayed on the operation screen (for example, the home screen 310a). Specifically, it is understood that it is not possible to use the functions, which are stopping, in such a way that the icons of the functions, which are stopping, are not displayed or gray-out displayed, and thus it is easy for the user to grasp the available functions. In addition, in a case where a fact that the power failure occurs and the integration service apparatus 100 is driven through feeding of the UPS (power storage device 160) is displayed (status field 314) on the operation screen (the home screen 310a or the like) during the power failure, it is possible to notify the user of a reason that the available functions are restricted.

Figure 2:
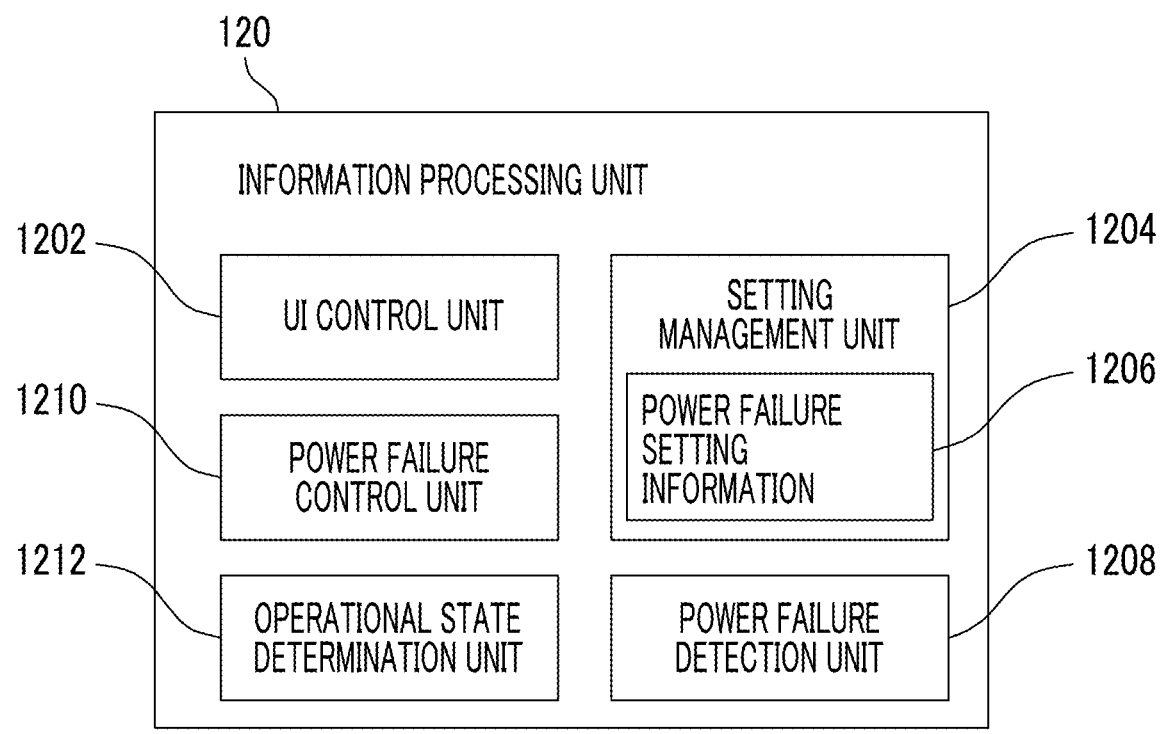
FIG. 2 is a diagram illustrating a functional configuration of an information processing unit.
Figure 10:
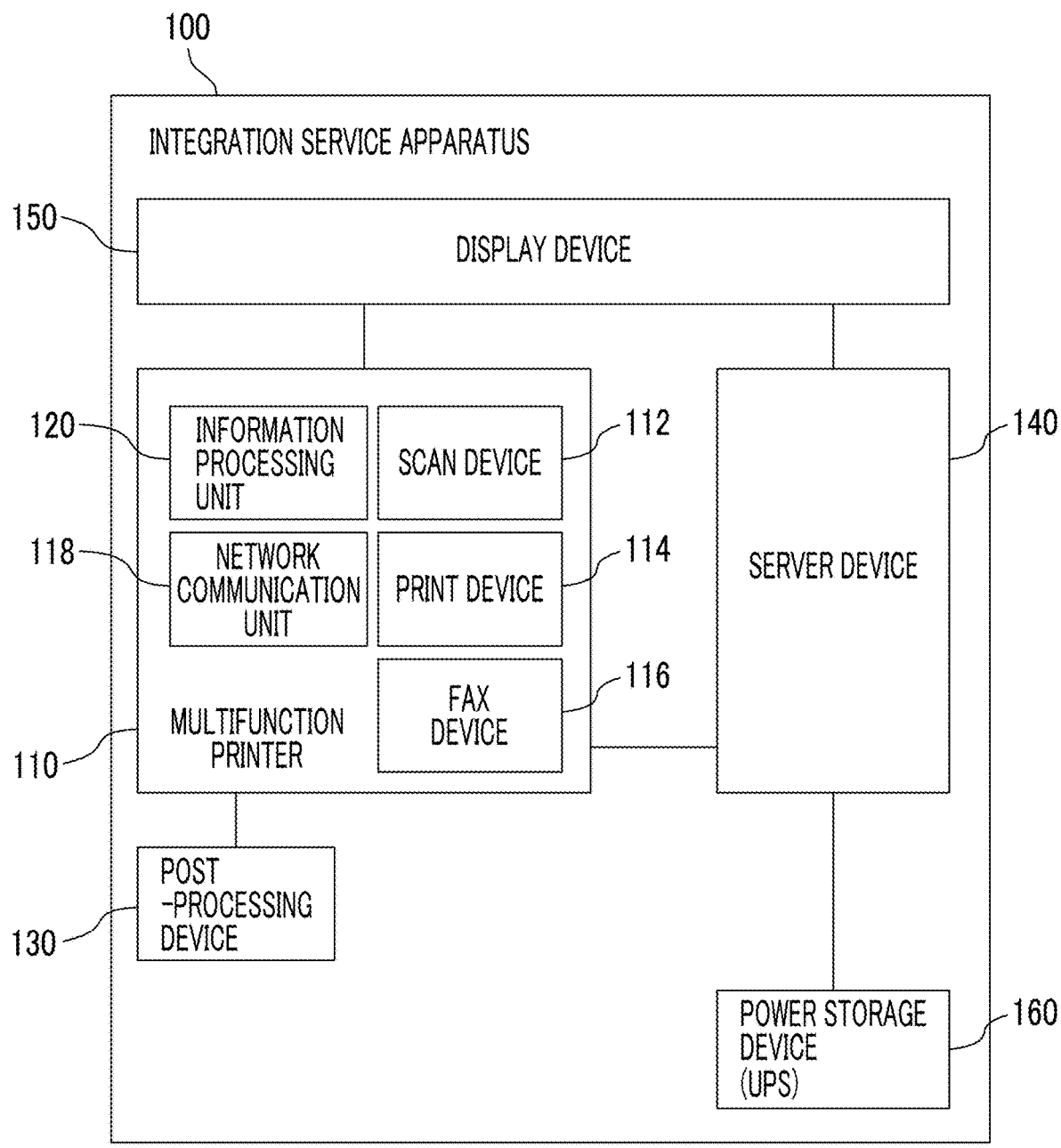
FIG. 10 is a diagram illustrating another configuration of the integration service apparatus.

In the example of the apparatus configuration illustrated in FIG. 1, feeding is performed from the power storage device 160 with respect to a part of the multifunction printer 110 and a part of the server device 140, respectively. However, the configuration is only an example. Instead, as illustrated in FIG. 10, a configuration may be provided in which feeding is performed from the power storage device 160 to a power circuit of the server device 140 and the multifunction printer 110 receives feeding from the power circuit of the server device 140. In this manner, even in a case where the whole multifunction printer 110 is shut down during the power failure, it is possible for the server device 140 to receive the supply of the electricity from the power storage device 160.

Figure 11:
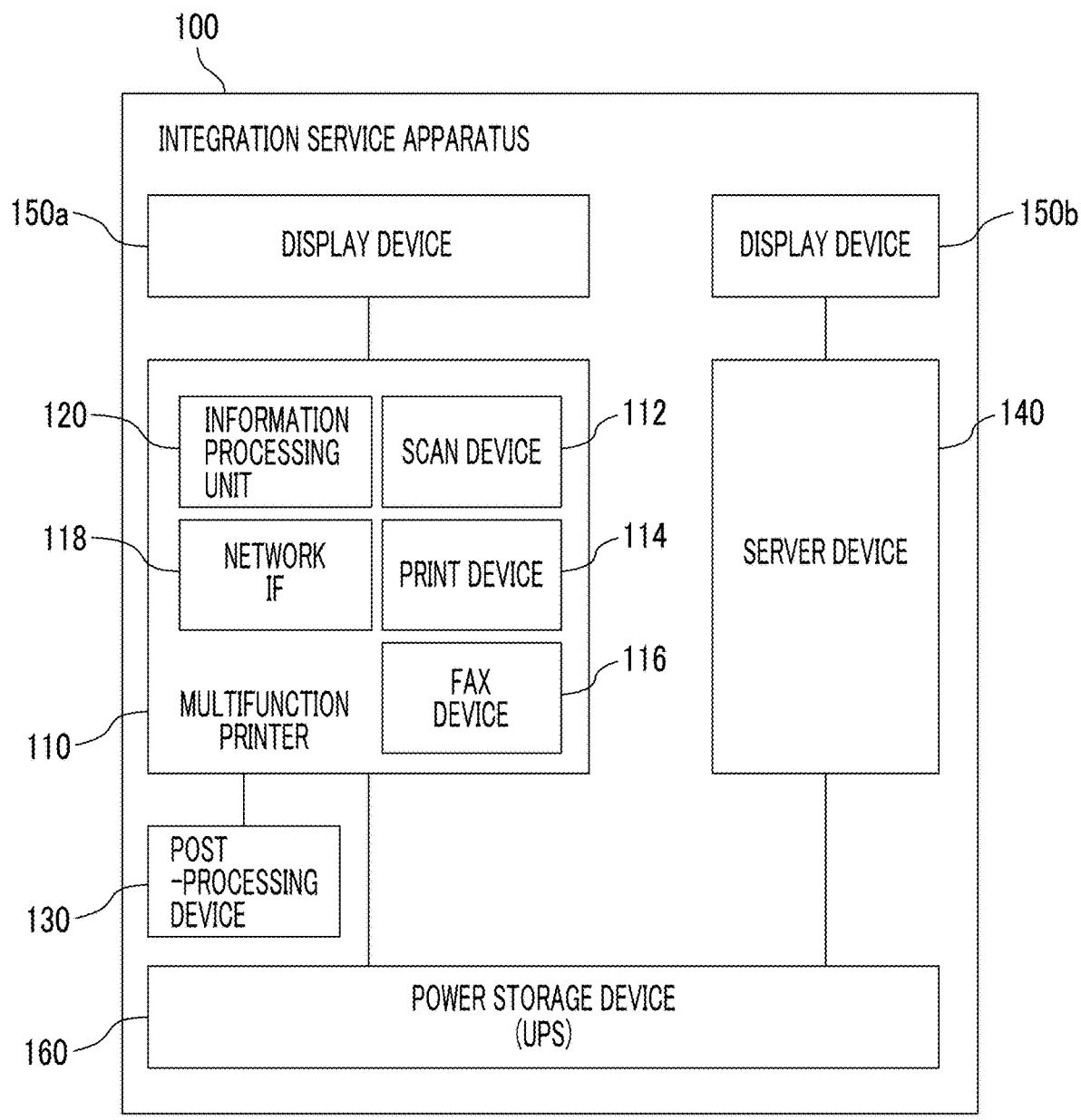
FIG. 11 is a diagram illustrating a further another configuration of the integration service apparatus.

In addition, in the example of FIG. 1, the multifunction printer 110 and the server device 140 share one display device 150. However, the configuration is only an example. Instead, as illustrated in FIG. 11, the multifunction printer 110 dedicated to the display device 150a and the server device 140 dedicated to the display device 150 may be separately provided. In the configuration, the display device 150*a* displays an operation screen relevant to the multifunction printer 110, and the display device 150*b* displays information relevant to the server device 140. The display device 150*b* may be, for example, a touch panel or the like which displays an operation screen of the server device 140, or may be only a flag which indicates being working. In a case where feeding to the multifunction printer 110 stops, feeding to the display device 150*a* also stops. In addition, in a case where feeding to the server device 140 stops, feeding to the display device 150*b* also stops. In an example, in a case where the power failure occurs, the power failure control unit 1210 shuts down the multifunction printer 110, the post-processing device 130, and the display device 150*b*. Therefore, the power storage device 160 stops the feeding to the side of the multifunction printer 110, and performs feeding to the server device 140 and the display device 150*b*, and thus a period during which it is possible to maintain the server function extends.

Subsequently, a modified example of the setting screen 200 of the power failure setting information 1206 will be described with reference to FIG. 12.

The setting screen 200 illustrated in FIG. 12 displays information which indicates a degree of electricity consumption of each of the functions with respect to each of the buttons 202*a* and 202*b* of the respective functions. The information indicates a level of a stage of the electricity consumption quantity of the function for each unit time. In the example illustrated in the drawing, three stages including large, middle, and small are displayed. However, the number of stages may be two or may be three or more. It is possible for the user to refer to the information of the degree of electricity consumption in a case of determining a function to be stopped during the power failure.

In addition, on the setting screen 200 in FIG. 12, an estimated driving time display field 210 is displayed. The estimated driving time display field 210 displays an estimated value of time, in which it is possible to drive the integration service apparatus 100 by the power storage device 160, in a work/non-work selection state of each function during the power failure on the setting screen 200. For example, the power failure control unit 1210 includes information of the electricity consumption quantity for each unit time for each function, and acquires a value of the electricity consumption quantity for unit time during the power failure of the whole integration service apparatus 100 by summing the electricity consumption quantity for unit time for each function selected to be worked during the power failure with reference to the information. Furthermore, the estimated driving time in a current selection state is calculated based on the value of the electricity consumption quantity and a maximum power quantity of the power storage device 160. It is possible for the user to use an estimated value of driving time in a case of determining a function to be stopped during the power failure.

Subsequently, a modified example used to further easily set the power failure setting information 1206 will be described. It is conceivable that a function to be maintained and a function to be stopped in the integration service apparatus 100 during the power failure depend on an installation purpose of the integration service apparatus 100. Here, the installation purpose includes a purpose of installation of the image forming apparatus to be used, and includes, for example, a type of business, a field of business to which the user (a company, a public organization, or the like) who uses the integration service apparatus 100 belongs, a "location" in which the integration service apparatus 100 is installed, a name of business, an attribute of the user who uses the integration service apparatus 100, a name of the user, and the like.

For example, according to the field of business, there is a case where the scan and print functions are more crucial than the server function during the power failure. For example, in a hospital or a clinic, there is a case where it is necessary to transfer a serious patient to a core hospital in a case of the power failure due to a disaster. In this case, it is necessary to print out an electronic medical record of the patient, to take over the printout to the core hospital, or to transfer a paper medical record to the core hospital via the FAX on the contrary. Therefore, in the hospital or the like, there is a possibility that it is desired to not set the print function, the scan function, and the FAX transmission function as the stop target functions during the power failure. In addition, in the financial organization, such as a post station or a bank, there is a case where various reports, such as a payment slip written by the user, are scanned and recorded, and it is needed to maintain the scan function during the power failure.

In the "location" where the integration service apparatus 100 is installed, it is conceivable that, for example, whether the integration service apparatus 100 faces an inside (an office, a factory, or the like) of the user who uses the integration service apparatus 100 or an outside (a shop, a public space, or the like) is distinguished. The integration service apparatus 100, which is installed to face the inside of the user (a company or the like), is mostly used by staffs of the user and the integration service apparatus 100, which is installed to face the outside, is mostly used by customers of the user. The integration service apparatus 100, which is installed to face the customers, is needed to output the printout for the customers, and it is desired to maintain the print function during the power failure as far as possible.

In addition, even in one field of business, there is a case where the function, which is desired to be maintained during the power failure, is changed according to an installation location. For example, in a case of the integration service apparatus 100, which is installed to provide various pieces of information to residents, at an entrance of a government office or the like, the information to be provided needs to be output in a form of printout, and a priority of the print function during the power failure is high. In contrast, even in the same government office, in a case of the integration service apparatus 100 which is installed in a work space of employees, a priority is higher on a side in which the server function is maintained during the power failure than a side in which the print function is maintained.

Figure 13:
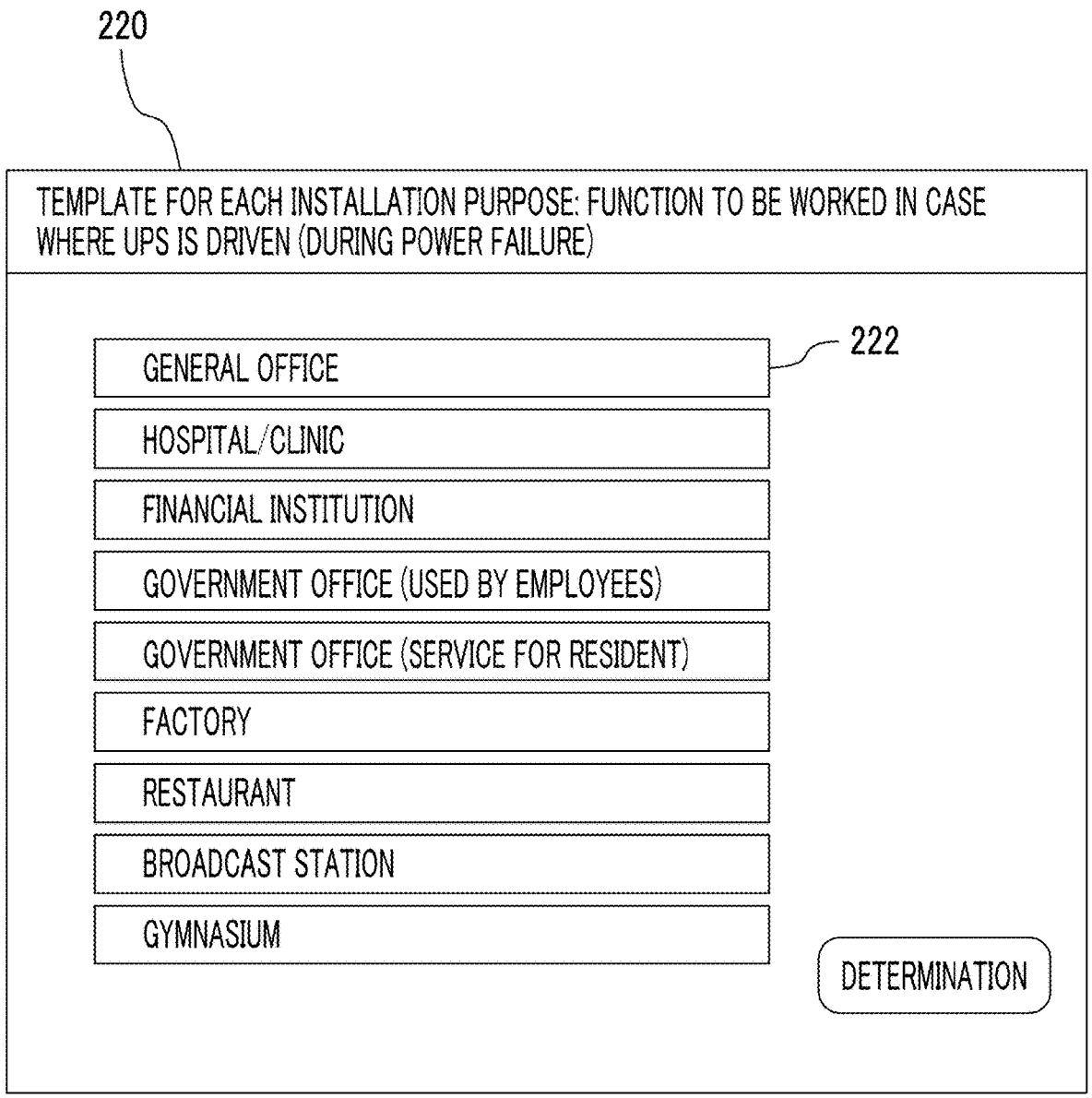
FIG. 13 is a diagram illustrating a selection screen of a template for each installation purpose.

From this, in the modified example, the integration service apparatus 100 includes default power failure setting information 1206 (template for each of the installation purposes) for each of the installation purposes which are represented by the field of business to be installed, the installation location, the combination thereof, and the like. Furthermore, as one screen used to set the power failure setting information 1206, a template selection screen for each installation purpose is provided. FIG. 13 illustrates an example of the template selection screen 220. On the template selection screen 220, buttons 222 for selecting the installation purposes of a general office, a hospital/clinic, a financial organization, employees of a government office, a resident service of the government office, a factory, and the like are enumerated and displayed. In a case where the user presses the button 222 corresponding to his/her installation purpose, the installation purpose becomes a selection state. Here, information (for example, a list which indicates each of the functions to be worked or stopped during the power failure) of the template corresponding to the installation purpose may be displayed on the screen such that the user is capable of recognizing content of the template. In a case where the button 222 of any of the installation purposes is selected and the determination button is pressed, the template of the relevant installation purpose is overwritten to the power failure setting information 1206 in the setting management unit 1204. In addition, the UI control unit 1202 displays the setting screen 200 (refer to FIG. 4), in which the value of the work flag during the power failure of each of the functions of the power failure setting information 1206 after overwriting the template, on the screen, and receives a setting change in ON and OFF during the power failure of each of the functions from the user. As described above, the user configures the power failure setting information 1206 according to a need of the user in a form in which minute adjustment is added to the template corresponding to the installation purpose.

Subsequently, a further another modified example will be described. In the modified example, the number of functions to be stopped increase in stages in accordance that the residual power quantity of the power storage device 160 during the power failure decreases.

In an example, the power failure setting information 1206 is prepared for each level of the residual power quantity, and the number of functions to be stopped increases according to the power failure setting information 1206 corresponding to a lesser residual power quantity in accordance that the residual power quantity of the power storage device 160 decreases during the power failure.

For example, it is assumed that the power failure setting information 1206 (specifically, the work flag during the power failure), which is acquired in a case where the residual power quantity of the power storage device 160 is in a range (first level) that is the half of a maximum value (full charge), is setting in which the FAX device, the wired network, the display device 150, the mail server, the file server, the FAX reception in a power storage mode, and the telephone service are caused to be worked and the other functions are caused to be stopped, as illustrated in FIG. 3. In contrast, for example, in the power failure setting information 1206, in which the residual power quantity of the power storage device 160 corresponds to a range (second level) from a half to ¼ of the maximum value, setting is performed such that the FAX device and the FAX reception are stopped among the functions to be worked in full charge. In the power failure setting information 1206, in which the residual power quantity corresponds to a range (third level) which is equal to or less than the ¼ of the maximum value, setting is performed such that the file server is further stopped. The setting management unit 1204 provides the setting screen 200 used to set the power failure setting information 1206 of a relevant level for each level of the residual power quantity. Here, on the setting screen 200 of the power failure setting information 1206 at a certain level, setting may be performed such that it is not possible to change the work flag during the power failure of a function, which is at a level in which the residual power quantity is larger and in which the work flag during the power failure is OFF, to ON. Meanwhile, division on the level of the residual power quantity illustrated here is only an example.

Figure 14:
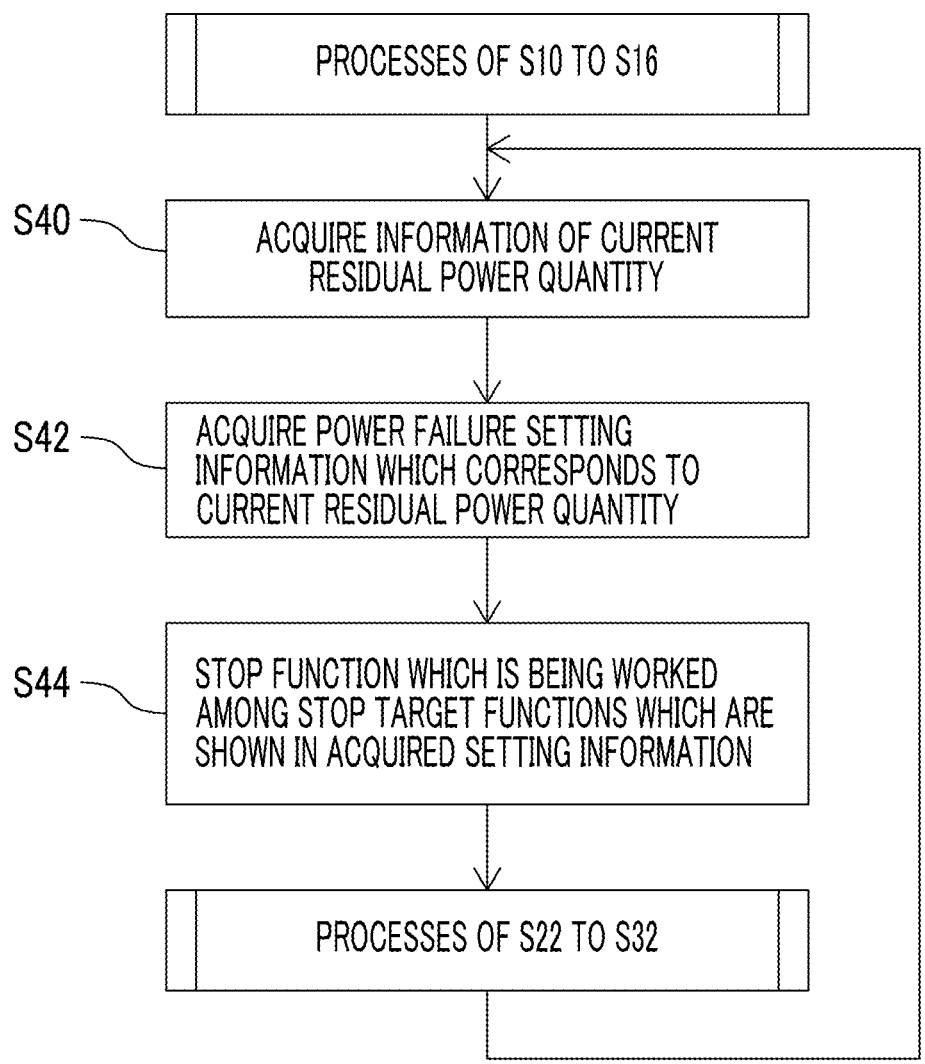
FIG. 14 is a flowchart illustrating a procedure of a process of properly using the power failure setting information according to a residual power quantity.

In the modified example, in a case where the power failure is detected, the power failure control unit 1210 performs, for example, control illustrated in FIG. 14. The control has the same procedure illustrated in FIGS. 5 and 6 from S10 to S16. In a case where the result of the determination in S16 is Yes, the power failure control unit 1210 acquires information of current residual power quantity from the power storage device 160 (S40), and acquires the power failure setting information 1206 corresponding to a level, to which the residual power quantity belongs, from the setting management unit 1204 (S42). Furthermore, the power failure control unit 1210 stops functions, in which the work flag during the power failure is OFF, in the acquired power failure setting information 1206 (S44). At this point of time, there is a case where functions which are already stopped exist. In such a case, among the functions in which the work flag during the power failure is OFF, a function which is worked at the point of time is stopped. After S44, the power failure control unit 1210 performs the processes in S22 to S32 of FIGS. 5 and 6. Furthermore, the processes in S40, S42, S44, and S22 to S32 are, for example, periodically repeated.

As described above, in the modified example, only functions which are previously set for each level of the residual power quantity are worked, and feeding to the other functions is stopped. Therefore, in a case where the residual power quantity is small, only functions which are selected more carefully are worked, and thus it is possible to extend the work time of the functions.

The modified example may be combined with the template for each previous installation purpose, that is, the template of the power failure setting information is held in the integration service apparatus 100 for each combination of the installation purpose and the residual power quantity level. In a case where the user or the like performs setting on the power failure setting information and designates the installation purpose, the setting management unit 1204 reads the template corresponding to the installation purpose for each residual power quantity level, and sets content (a value of ON or OFF of the work flag during the power failure for each function) of the template as the power failure setting information 1206, which corresponds to each residual power quantity level. Furthermore, the content of the power failure setting information 1206 for each residual power quantity level is sequentially displayed on the screen, and an instruction to change ON and OFF is received from the user.

In addition, a case is also conceivable where it is desired to change the setting of the power failure setting information 1206 during the power failure. For example, a case where it is desired to use a function which is stopped in the current setting or the like is an example thereof. As illustrated in FIG. 15, in a case where the setting management unit 1204 receives an instruction to change the setting of the power failure setting information 1206 from the user (a result of determination in S50 is Yes) and the power failure already occurs at the point of time, the setting management unit 1204 causes the UI control unit 1202 to display the setting screen 200 (FIG. 4) in which the power failure setting information 1206 (in other words, setting which defines a function which currently stops) corresponding to the current residual power quantity level is reflected (S52). Therefore, the buttons 202*a* and 202*b*, to which work or stop of each current function is reflected, are displayed on the setting screen 200. Therefore, here, the user changes a function, which is necessary to be currently used, to ON among the functions in which the work flag during the power failure is OFF (that is, the stop target) or changes a function, in which the work flag is ON now but which is not necessary, to OFF. In a case where the user presses the determination button, the setting management unit 1204 changes the power failure setting information 1206, which corresponds to the current residual power quantity level, to information which indicates the ON or OFF state of the flag of each function illustrated in setting screen 200.

The information processing unit 120 or the server device 140 of the above-described integration service apparatus 100 is realized by causing a computer to execute, for example, a program which expresses the functions of respective units. Here, for example, the computer includes a circuit configuration in which, as hardware, a microprocessor, such as a CPU, a memory (primary storage), such as a Random Access Memory (RAM) or a Read Only Memory (ROM), a Hard Disk Drive (HDD) controller which controls a HDD, various Input/Output (I/O) interfaces, a network interface which performs control for connection to a network, such as a local area network, and the like are connected through, for example, a bus. In addition, a disk drive used to perform reading and/or writing on a portable disk recording medium, such as a CD or a DVD, a memory reader/writer used to perform reading and/or writing on a portable nonvolatile recording medium, such as a flash memory, in conformity to various standards, and the like may be connected to the bus through, for example, the I/O interfaces. The program, in which processing content of each of the above-illustrated function modules is written, is preserved in the fixed storage device, such as the hard disk drive, and installed in the computer through the recording medium, such as the CD or the DVD, or a communication section, such as the network. In a case where the program, which is stored in the fixed storage device, is read into the RAM and is executed by the microprocessor, such as the CPU, the above-illustrated function module group is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a power storage device that is capable of supplying electricity to the image forming apparatus in a case where electricity is not supplied from an external power source; and
    a processor, configured to:
        provide a plurality of functions which include an image forming function and one or more server functions,
        receive and hold an input of setting information from a user, wherein the setting information defines a stop target function to be stopped and a work target function to be worked in a case where electricity is supplied from the power storage device among the plurality of functions, wherein the stop target function is different from the work target function; and
        perform control to cause the stop target function, which is defined in the setting information, to be stopped among the plurality of functions, and perform control to cause the work target function, which is defined in the setting information, to be worked among the plurality of functions in the case where the electricity is supplied from the power storage device.

2. The image forming apparatus according to claim 1, wherein the image forming apparatus includes default information, which is prepared for each of installation purposes of the image forming apparatus and which defines a default stop target function or a default work target function corresponding to the installation purpose, and
wherein the processor receives selection of the installation purpose of the image forming apparatus from the user, and holds the default information corresponding to the selected installation purpose as the setting information.

3. The image forming apparatus according to claim 2, wherein the processor displays a setting screen that shows the stop target function or the work target function, which is selected from the plurality of functions and is defined in the default information corresponding to the installation purpose, receives an instruction to change the stop target function or the work target function on the setting screen, and holds information, which defines the stop target function or the work target function shown on the setting screen in a case where a confirmation instruction is input, as the setting information.

4. The image forming apparatus according to claim 1, wherein the processor receives an input of the setting information for each level of a residual power quantity of the power storage device, and holds the setting information for each level, and
wherein the processor performs the control to cause the stop target function to be stopped or performs the control to cause the work target function to be worked, the functions being defined in the setting information corresponding to a level of a current residual power quantity, in a case where the electricity is supplied from the power storage device.

5. The image forming apparatus according to claim 2, wherein the processor receives an input of the setting information for each level of a residual power quantity of the power storage device, and holds the setting information for each level, and
wherein the processor performs the control to cause the stop target function to be stopped or performs the control to cause the work target function to be worked, the functions being defined in the setting information corresponding to a level of a current residual power quantity, in a case where the electricity is supplied from the power storage device.

6. The image forming apparatus according to claim 3, wherein the processor receives an input of the setting information for each level of a residual power quantity of the power storage device, and holds the setting information for each level, and
wherein the processor performs the control to cause the stop target function to be stopped or performs the control to cause the work target function to be worked, the functions being defined in the setting information corresponding to a level of a current residual power quantity, in a case where the electricity is supplied from the power storage device.

7. The image forming apparatus according to claim 4, wherein the processor has a function of displaying the setting information corresponding to the level of the current residual power quantity, and receiving an instruction to change the stop target function or the work target function with respect to the displayed setting information.

8. The image forming apparatus according to claim 5, wherein the processor has a function of displaying the setting information corresponding to the level of the current residual power quantity, and receiving an instruction to change the stop target function or the work target function with respect to the displayed setting information.

9. The image forming apparatus according to claim 6, wherein the processor has a function of displaying the setting information corresponding to the level of the current residual power quantity, and receiving the instruction to change the stop target function or the work target function with respect to the displayed setting information.

10. The image forming apparatus according to claim 4, wherein the processor includes definition information that defines a default stop target function or a default work target function, which is prepared for each combination of the installation purpose of the image forming apparatus and the level of the residual power quantity and which corresponds to the combination, receives selection of the combination of the installation purpose and the level from the user, and holds the definition information corresponding to the selected combination as the setting information related to the combination.

11. The image forming apparatus according to claim 5, wherein the image forming apparatus includes definition information that defines the default stop target function or the default work target function, which is prepared for each combination of the installation purpose of the image forming apparatus and the level of the residual power quantity and which corresponds to the combination, and
wherein the processor receives selection of the combination of the installation purpose and the level from the user, and holds the definition information corresponding to the selected combination as the setting information related to the combination.

12. The image forming apparatus according to claim 6, wherein the image forming apparatus includes definition information that defines the default stop target function or the default work target function, which is prepared for each combination of the installation purpose of the image forming apparatus and the level of the residual power quantity and which corresponds to the combination, and
wherein the processor receives selection of the combination of the installation purpose and the level from the user, and holds the definition information corresponding to the selected combination as the setting information related to the combination.

13. The image forming apparatus according to claim 10, wherein the processor exhibits the setting screen that shows the stop target function or the work target function which is defined in the definition information corresponding to the combination of an installation purpose selected from the user and the level, receives the instruction to change the stop target function or the work target function on the setting screen, and holds the information, which defines the stop target function or the work target function shown on the setting screen in a case where a confirmation instruction is input, as the setting information corresponding to the combination.

14. The image forming apparatus according to claim 1, wherein the processor displays time during which it is possible for the power storage device to supply the electricity in a case where a group of functions other than the stop target function is worked among the plurality of functions or in a case where a group of the work target functions is worked.

15. The image forming apparatus according to claim 1, wherein the processor displays a level of an electricity consumption quantity in a case where each of the plurality of functions is worked.

16. A non-transitory computer readable medium storing a program causing a computer, provided in an integration service apparatus including a power storage device that is capable of supplying electricity in a case where electricity is not supplied from an external power source, to:
provide a plurality of functions including an image forming function and one or more server functions; and
receive and hold an input of setting information from a user, wherein the setting information defines a stop target function to be stopped and a work target function to be worked in a case where electricity is supplied from the power storage device among the plurality of functions, wherein the stop target function is different from the work target function; and
perform control to cause the stop target function, which is defined in the setting information, to be stopped among the plurality of functions, and perform control to cause the work target function, which is defined in the setting information, to be worked among the plurality of functions, in the case where the electricity is supplied from the power storage device.

17. An image forming system comprising:
an image forming apparatus that provides an image forming function;
a server device that provides one or more server functions;
a power storage device that is capable of supplying electricity to at least the server device in a case where electricity is not supplied from an external power source; and
a processor, configured to:
receive and hold an input of setting information from the user, wherein the setting information defines a stop target function to be stopped and a work target function to be worked among the image forming function and the one or more server functions in a case where electricity is supplied from the power storage device, wherein the stop target function is different from the work target function; and
perform control to cause the stop target function, which is defined in the setting information, to be stopped among the plurality of functions, and performs control to cause the work target function, which is defined in the setting information, to be worked among the plurality of functions in the case where the electricity is supplied from the power storage device.

18. An image forming apparatus comprising:
a power storage device that is capable of supplying electricity to the image forming apparatus in a case where electricity is not supplied from an external power source; and
a processor, configured to:
provide a plurality of functions which include an image forming function and a plurality of server functions; and
perform control to stop supplying the electricity from the power storage device to the image forming function among the plurality of functions in a case where the electricity is supplied from the power storage device, and perform control to cause a portion of the plurality of server functions to be worked by supplying the electricity from the power storage device.

19. The image forming apparatus according to claim 18, wherein the processor stops the server function, which is previously set to be stopped in a case where the electricity is supplied from the power storage device, among the plurality of server functions, in a case where the electricity is supplied from the power storage device.

20. The image forming apparatus according to claim 18, wherein, in a case where the electricity is supplied from the power storage device, the processor performs control to stop supplying the electricity from the power storage device to one or more element functions, which are previously set to be stopped, among a plurality of element functions constituting the image forming function, and performs control to supply the electricity from the power storage device to the element functions other than the one or more element functions.

* * * * *